(12) United States Patent
Lo

(10) Patent No.: US 8,228,307 B2
(45) Date of Patent: Jul. 24, 2012

(54) PORTABLE COMPUTER AND TOUCH INPUT DEVICE

(75) Inventor: Yu-Wei Lo, Taipei (TW)

(73) Assignee: Asustek Computer Inc., Taipei (TW)

( * ) Notice: Subject to any disclaimer, the term of this patent is extended or adjusted under 35 U.S.C. 154(b) by 315 days.

(21) Appl. No.: 12/562,441

(22) Filed: Sep. 18, 2009

(65) Prior Publication Data
US 2010/0073314 A1 Mar. 25, 2010

(30) Foreign Application Priority Data
Sep. 19, 2008 (TW) .............................. 97136074 A

(51) Int. Cl.
*G06F 3/041* (2006.01)
(52) U.S. Cl. ......... 345/173; 345/174; 345/156; 345/168
(58) Field of Classification Search .................. None
See application file for complete search history.

(56) References Cited

U.S. PATENT DOCUMENTS

| 7,274,353 | B2 | 9/2007 | Chiu et al. | |
| 2005/0259086 | A1* | 11/2005 | Chiu et al. | 345/173 |
| 2006/0152484 | A1* | 7/2006 | Rolus Borgward | 345/157 |
| 2006/0244727 | A1 | 11/2006 | Salman et al. | |
| 2008/0218371 | A1* | 9/2008 | Joo | 340/815.65 |
| 2009/0066659 | A1* | 3/2009 | He et al. | 345/173 |
| 2009/0195959 | A1* | 8/2009 | Ladouceur et al. | 361/283.1 |
| 2010/0137033 | A1* | 6/2010 | Lee | 455/566 |

FOREIGN PATENT DOCUMENTS

| CN | 1294310 A | 5/2001 |
| CN | 1719397 A | 1/2006 |

* cited by examiner

*Primary Examiner* — Lixi C Simpson
(74) *Attorney, Agent, or Firm* — Morrison Manning & Martin LLP; Tim Tingkang Xia, Esq.

(57) ABSTRACT

The invention discloses a portable computer comprising a host, a touch input device disposed in the host, and a displayer pivoted on the host. The touch input device comprises a touch module, a switch and a controller. The controller is coupled to the touch module and the switch. The touch module is for performing a first touch function or a second touch function and for displaying a first touch pattern or a second touch pattern correspondingly. The switch drives the controller to control the touch module to perform the first touch function or the second touch function and control the touch module to display the first touch pattern or the second touch pattern correspondingly.

16 Claims, 4 Drawing Sheets

PORTABLE COMPUTER AND TOUCH INPUT DEVICE

BACKGROUND OF THE INVENTION

1. Field of the Invention

The present invention relates generally to a touch input device, and more particularly, the touch input device with different touch modes to be switched.

2. Description of the Prior Art

Nowadays, the development of notebook computers is an extremely prompt with the continuous evolution of information technology. Owing to various advantages such as a small size, the thinness, light weight, and portable, notebook has been gradually becoming one of the most popular computer equipment.

Generally, users usually input information by keyboard when operating notebooks. However, the traditional keyboard is not only complicated but also large in size, resulting in the heaviness of the notebook. Additionally, there are spaces between each key on the keyboard, which become easily covered with dust and are inconvenient to clean. With the promotion of multimedia technology, moreover, many hot keys are disposed on notebooks for users to operate multimedia application programs quickly. However, the disposition of hot keys increases the volume of the keyboard and decreases the structural volume inside the shell.

SUMMARY OF THE INVENTION

Accordingly, an aspect of the present invention is to provide a touch input device, suitable for a portable computer. The touch input device of the invention can switch the touch mode to different modes by users without a traditional keyboard and other hot keys. Another aspect of the present invention is to provide a touch input device which can actively switch the touch mode to different mode according to users' operating actions.

According to an embodiment of the invention, the touch input device comprises a touch module, a switch, and a controller. The controller is coupled to the touch module and the switch.

According to the embodiment, the touch module is for performing a first touch function or a second touch function and for displaying a first touch pattern or a second touch pattern correspondingly; the switch is for switching the first touch function or the second touch function.

The switch drives the controller to control the touch module to perform the first touch function or the second touch function. While the touch module is operating the first touch function, the controller controls the touch module to display a first touch pattern. While the touch module is operating the second touch function, the controller controls the touch module to display a second touch pattern.

According to the embodiment, the first touch pattern could be a standard keyboard pattern, and the second touch pattern could be a multimedia broadcasting pattern or other customized touch pattern. Therefore, the invention of the touch input device allows users to switch different touch modes in a single touch module without a traditional keyboard or other hot keys.

According to another embodiment of the invention, the switch could comprise two pressure sensors located on both sides of the touch module respectively. The pressure sensors are suitable for sensing pressure simultaneously or individually in order to control the touch module to perform the first touch function or the second touch function. For example, while both of the pressure sensors are pressed by users, the controller controls the touch module to perform the first touch function; while one of pressure sensors is pressed by users, the controller controls the touch module to perform the second touch function.

In other words, the invention applies two pressure sensors to sense users' operating actions and then actively switches to different touch mode according to users' operating actions. So the touch mode changes as the users' operating actions change, and the manual switch is not necessary.

Yet another aspect of the present invention is to provide a portable computer comprising a host, a touch input device as described above, and a displayer pivoted on the host. The said touch input device is disposed in the host.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 1:
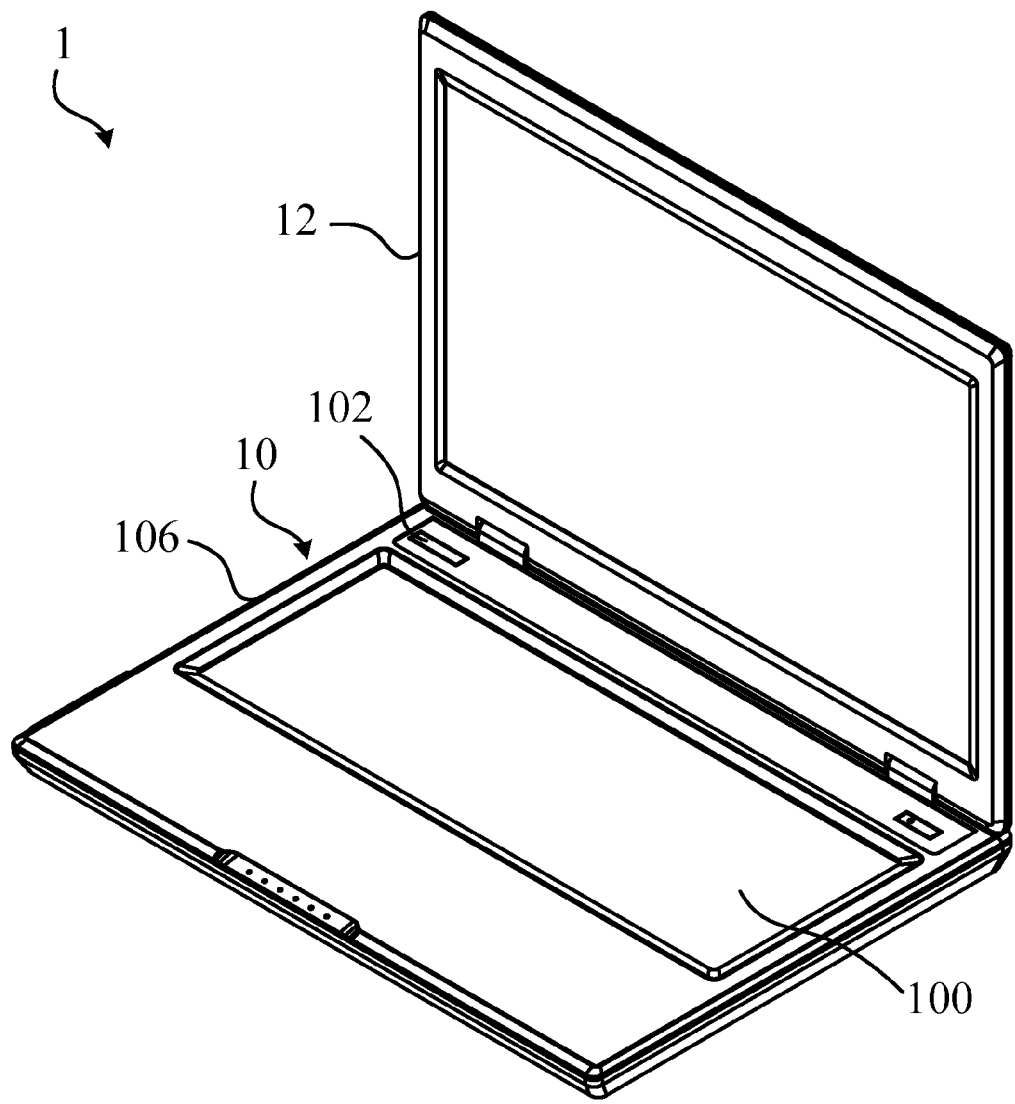
FIG. 1 illustrates the portable computer of an embodiment of the invention.

Please refer to FIG. 1 which illustrates the portable computer 1 of an embodiment of the invention. The portable computer 1 of the invention can be, but not limited to, a notebook as shown in FIG. 1. The portable computer 1 as illustrated in FIG. 1 comprises a touch input device 10, a displayer 12 and a host 14. Wherein the touch input device 10 is disposed in the host 14. The displayer 12 is pivoted on the host 14, and users' can operate the displayer 12 to rotate relative to the host 14. Additionally, the displayer 12 could be a liquid crystal display (LCD).

Figure 2:
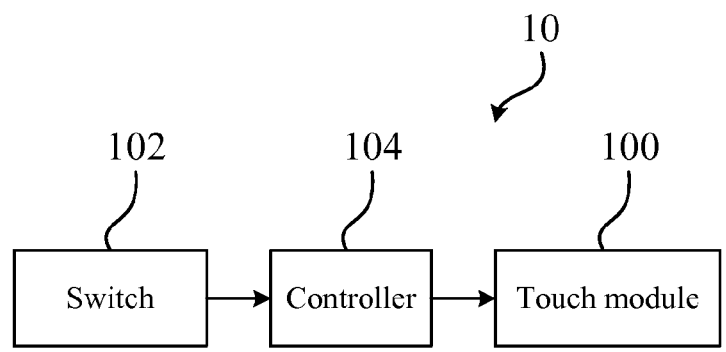
FIG. 2 is a functional block of the touch input device of the invention.

Please refer to FIG. 1 and FIG. 2. FIG. 2 is a functional block of the touch input device 10 of an embodiment of the invention. The touch input device 10 of an embodiment of the invention as illustrated in FIG. 2 comprises a touch module 100, a switch 102 and a controller 104. The controller 104 is coupled to the touch module 100 and the switch 102, wherein the controller 104 is disposed inside the host 14 thus is not illustrated in FIG. 1.

Figure 3:
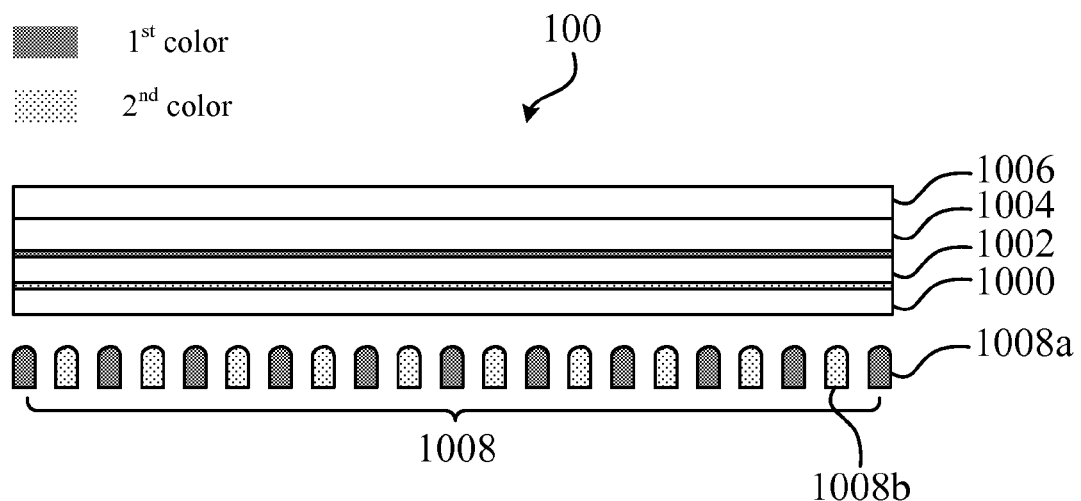
FIG. 3 is a side view of the touch module of the invention.
Figure 4:
FIG. 4 is a top view of the first transparent layer, the second transparent layer, the touch panel, and the protective layer of FIG. 3.
Figure 4:
Figure 4:
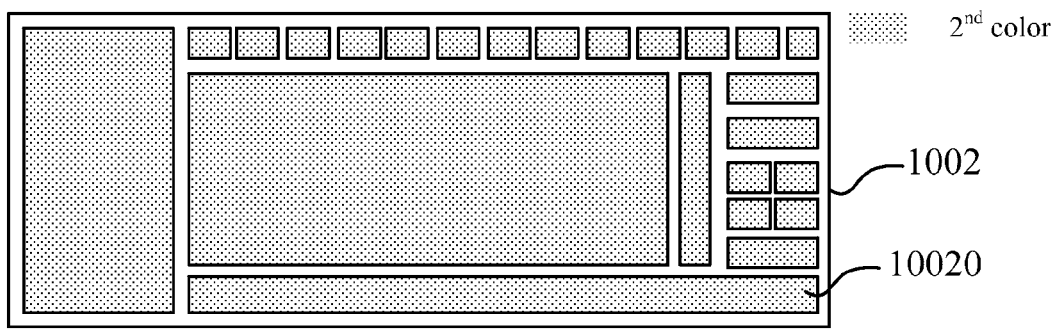
Figure 4:
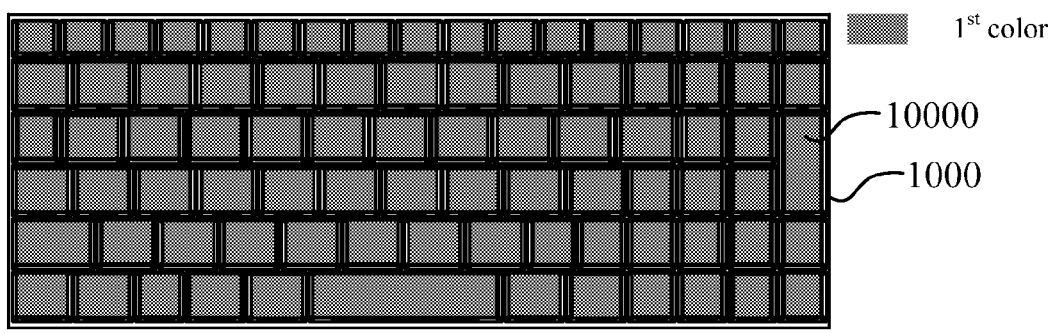

Please refer to FIG. 3 and FIG. 4. FIG. 3 is a side view of the touch module 100 of an embodiment of the invention. FIG. 4 is a top view of the first transparent layer 1000, the second transparent layer 1002, the touch panel 1004, and the protective layer 1006 of FIG. 3. As illustrated in FIG. 3, the touch module 100 comprises the first transparent layer 1000, the second transparent layer 1002, the touch panel 1004, the protective layer 1006, and the light emitting module 1008. The second transparent layer 1002 is disposed on the first transparent layer 1000, the touch panel 1004 is disposed on the second transparent layer 1002, and the protective layer 1006 is disposed on the touch panel 1004. Furthermore, the light emitting module 1008 is disposed near the first transparent layer 1000 and the second transparent layer 1002. In FIG. 3, the light emitting module 1008 is disposed under the first transparent layer 1000 but not restricted to this example. According to another embodiment of the invention, the light emitting module 1008 could be disposed around the first transparent layer 1000 and the second transparent layer 1002, it depends.

The first transparent layer 1000, the second transparent layer 1002, and the protective layer 1006 could be individually made of transparent materials, such as polymethylmethacrylate (PMMA), etc. The touch panel 1004 could be a capacitive touch panel, a resistive touch panel, an infrared touch panel, or a saw touch panel. The light emitting module 1008 could consist of plural light emitting diodes.

As FIG. 4, the first transparent layer 1000 provides a first touch pattern 10000, and the second transparent layer 1002 is provided with a second touch pattern 10020, wherein the first touch pattern 10000 provides a transparent material with a first color formed on the first transparent layer 1000, the second touch pattern 10020 provides a transparent material with a second color formed on the second transparent layer 1002. The first color and the second color depend on the practical application. The first touch pattern 10000 and the second touch pattern 10020 are formed on the first transparent layer 1000 and the second transparent layer 1002 correspondingly by printing or some other appropriate ways. For example, the first color could be red and the second color could be green. In practical application, the first touch pattern 10000 could be a standard keyboard pattern, and the second touch pattern 10020 could be a multimedia broadcasting pattern or other customized touch pattern.

Moreover, refer to FIG. 2 and FIG. 3, the light emitting module 1008 consists of plural first light emitting units 1008*a* and plural second light emitting units 1008*b*. The first light emitting units 1008*a* could be controlled by the controller 104 to emit light with the first color, and the second light emitting units 1008*b* could be controlled by the controller 104 to emit light with the second color. For example, if the color of the first touch pattern 10000 is red and the color of the second touch pattern 10020 is green, the first light emitting units 1008*a* emit red light and the second light emitting units 1008*b* emit green light.

The protective layer could be colorless and transparent or a deep color, for covering the first touch pattern 10000 and the second touch pattern 10020 in a general situation.

Please refer to FIG. 1 again, the switch 102 is a push-button switch for users to switch the touch module 100 to the first touch function or the second touch function. The first touch function is corresponding to the first touch pattern 10000 on the first transparent layer 1000; the second touch function is corresponding to the second touch pattern 10020 on the second transparent layer 1002. The input control is related to the first touch function and the second touch function could be completed by programming, unnecessary details are not given here.

According to the embodiment, when users operate the switch 102 to switch the touch module 100 to perform the first touch function, the switch 102 drives the controller 104 to control the touch panel 1004 of the touch module 100 to perform the first touch function. At that time, the controller 104 controls the second light emitting unit 1008*b* of the light emitting module 1008 to emit light with the second color. Because the color of the second touch pattern 10020 is also the second color, the color of the second touch pattern 10020 will be darkened so that only the first touch pattern 10000 will reveal below the touch panel 1004. Thus, users can touch the push-button on the first touch pattern 10000 to input information.

However, when users operate the switch 102 to switch the touch module 100 to perform the second touch function, the switch 102 drives the controller 104 to control the touch panel 1004 of the touch module 100 to perform the second touch function. At that time, the controller 104 controls the first light emitting unit 1008*a* of the light emitting module 1008 to emit light with the first color. Because the color of the first touch pattern 10000 is also the first color, the color of the first touch pattern 10000 will be darkened so that only the second touch pattern 10020 will reveal below the touch panel 1004. Thus, users can touch the push-button on the second touch pattern 10020 to input information.

According to an embodiment, the said first touch function and the said second touch function comprise of at least one of the keyboard touch functions and the cursor dragging function, and the first touch pattern 10000 and the second touch pattern 10020 as above comprise at least one of the keyboard pattern and the cursor dragging region. For example, if the first touch function is provided only with the keyboard touch function, the first touch pattern 10000 is only the keyboard pattern; if the first touch function is provided with both of the keyboard touch function and the cursor dragging function, the first touch pattern 10000 comprises both of the keyboard pattern and the cursor dragging region. Similarly, if the second touch function is provided only with the keyboard touch function, the second touch pattern 10020 is only the keyboard pattern; if the second touch function is provided with both of the keyboard touch function and the cursor dragging function, the second touch pattern 10020 comprises both of the keyboard pattern and the cursor dragging region.

Figure 5:
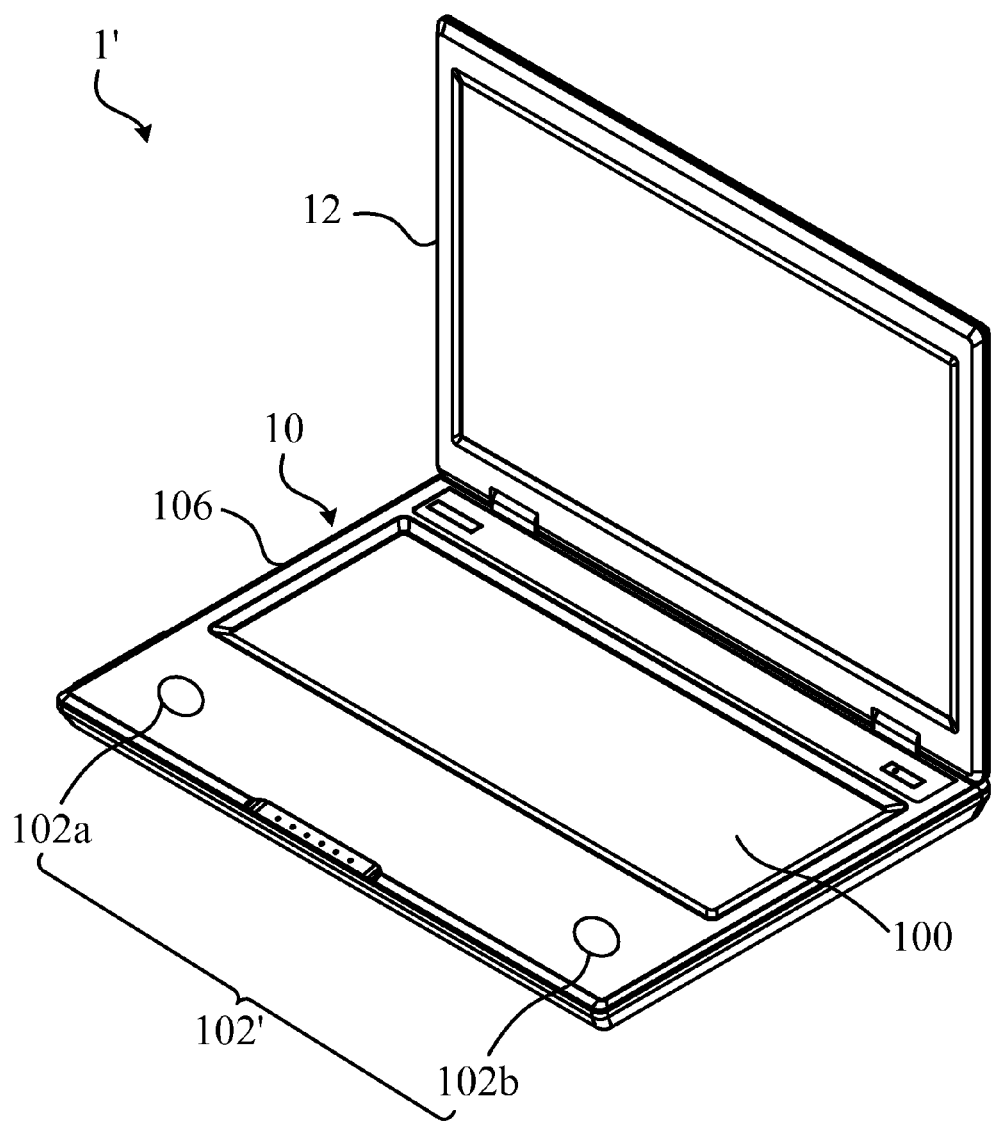
FIG. 5 illustrates the portable computer of another embodiment of the invention.

According to another embodiment, the switch 102 allows users to switch the touch module 100 to the cursor dragging function in addition to the first touch function and the second touch function. When users operate the switch 102 to switch the touch module 100 to the cursor dragging function, the switch 102 drives the controller 104 to control the touch panel 1004 of the touch module 100 to perform the cursor dragging function. At that time, all of the first light emitting units 1008*a* and the second light emitting units 1008*b* of the light emitting module 1008 are not lighting. So that users can write on the touch module 100 by their hand or a pen to input information. Please refer to FIG. 5. FIG. 5 illustrates the portable computer 1' of another embodiment of the invention. The main difference between the portable computer 1' and the portable computer 1 is that the switch 102' of the portable computer 1' comprises two pressure sensors 102*a* and 102*b*. When operating the portable computer 1', users habitually put their two hands on both sides of the portable computer 1' if they want to input information by keyboard. As illustrated in FIG. 5, two pressure sensors 102*a* and 102*b* are disposed individually on both sides of the host 14. When users want to input information by traditional keyboard, they only need to press two pressure sensors 102*a* and 102*b* with two hands correspondingly. When both of the pressure sensors 102*a* and 102*b* are pressed simultaneously, the controller 104 controls the touch module 100 to perform the first touch function as above and display the first touch pattern 10000 illustrated in FIG. 4, for allowing users to input information.

However, only one hand is used generally when users want to operate a multimedia broadcasting keyboard or other customized keyboard. Namely, only one hand will press the pressure sensor 102*a* or the pressure sensor 102*b*. When one of the pressure sensors 102*a* and the pressure sensor 102*b* is pressed, then the controller 104 controls the touch module 100 to perform the second touch function as above and display the second touch pattern 10020 illustrated in FIG. 4, for allowing users to input information.

Furthermore, if the cursor dragging function can be performed on the touch module 100 and the cursor dragging function is proceeding on the touch module 100, none of users' hands will touch the host 14 as a general rule. When both of the pressure sensors 102a and 102b are idle, then the controller 104 controls the touch module 100 to perform the cursor dragging function. At that time, users can perform dragging by hand or a touch pen on the touch module 100, for controlling the mouse cursor or proceeding to manual input.

More particularly, the controller 104 controls the touch module 100 by a different press sensing mode sensed by pressure sensors 102a and 102b to perform standard keyboard input function, a multimedia broadcasting keyboard, dragging function, or other customized keyboard input functions, etc. All of the functions mentioned above are for examples, but the invention is not restricted within them.

What is needed to explain is that the other principles of the portable computer 1' illustrated in FIG. 5 and those of the portable computer 1 illustrated in FIG. 1 are approximately the same, unnecessary details are not given here.

Comparing to the prior art, the touch input device of the invention enables users to switch to different touch modes in a single touch module without a traditional physical keyboard and other hot keys. In this way, the thickness of the portable computer's sell is decreased, and the inner spaces are increased and can easily be cleaned. Additionally, users' operating action can be sensed by the pressure sensor to switch to different touch modes actively according to the users' operating action. So that the touch mode changes as users change their operating action without any manual switch. It's quite convenient for users. Moreover, the touch patterns can be customized according to users' requirement accompany with appropriate software to reach customized touch function.

Although the present invention has been illustrated and described with reference to the preferred embodiment thereof, it should be understood that it is in no way limited to the details of such embodiment but is capable of numerous modifications within the scope of the appended claims.

What is claimed is:

1. A touch input device comprising:
   a touch module, for performing a first touch function or a second touch function for displaying a first touch pattern or a second touch pattern correspondingly;
   a switch, for switching the first touch function and the second touch function; and
   a controller, coupled to the touch module and the switch, and the switch driving the controller to control the touch module to perform the first touch function or the second touch function and control the touch module to display the first touch pattern or the second touch pattern correspondingly,
   wherein the touch module comprises:
      a first transparent layer which the first touch pattern is formed on
      a second transparent layer, disposed on the first transparent layer, which the second touch pattern is formed on
      a light emitting module, disposed near the first transparent layer and the second transparent layer; and
      a touch panel, disposed on the second transparent layer for performing the first touch function or the second touch function, and the controller controlling the light emitting module lighting, so as to display the first touch pattern or the second touch pattern,
   wherein the first touch pattern is provided with a first color, the second touch pattern is provided with a second color, the light emitting module comprises a first light emitting unit and a second light emitting unit, the second light emitting unit emits a light with the second color while the touch panel performing the first touch function, and the first light emitting unit emits a light with the first color while the touch panel performing the second touch function.

2. The touch input device of claim 1, wherein the touch module further comprises a protective layer disposed on the touch panel.

3. The touch input device of claim 2, wherein the protective layer is transparent and provided with a third color.

4. The touch input device of claim 1, wherein the switch is a push-button switch.

5. The touch input device of claim 1, wherein the switch comprises two pressure sensors located on both sides of the touch module respectively.

6. The touch input device of claim 5, wherein the pressure sensors are suitable for sensing pressure simultaneously or individually in order to control the touch module to perform the first touch function or the second touch function.

7. The touch input device of claim 1, wherein the first touch function and the second touch function comprise at least one of the keyboard touch function and the cursor dragging function.

8. The touch input device of claim 1, wherein the first touch pattern and the second touch pattern comprise at least one of the keyboard pattern and the cursor dragging region.

9. A portable computer comprising:
   a host;
   a touch input device disposed in the host, and the touch input device comprising:
      a touch module for performing a first touch function or a second touch function for displaying a first touch pattern or a second touch pattern correspondingly;
      a switch for switching the first touch function and the second touch function; and
      a controller, coupled to the touch module and the switch, and the switch driving the controller to control the touch module to perform one of the first and second touch functions and control the touch module to display the first or second touch pattern correspondingly,
      wherein the touch module comprises:
         a first transparent layer which the first touch pattern is formed on;
         a second transparent layer, disposed on the first transparent layer, which the second touch pattern is formed on;
         a light emitting module, deposited near the first transparent layer and the second transparent layer; and
         a touch panel, disposed on the second transparent layer for performing the first touch function or the second touch function, and the controller controlling the light emitting module lighting, so as to display the first touch pattern or the second touch pattern,
      wherein the first touch pattern is provided with a first color, the second touch pattern is provided with a second color, the light emitting module comprises a first light emitting unit and a second light emitting unit, the second light emitting unit emits a light with the second color while the touch panel performing the first touch function, and the first light emitting unit emits a light with the first color while the touch panel performing the second touch function; and a displayer pivoted on the host.

10. The portable computer of claim 9, wherein the touch module further comprises a protective layer disposed on the touch panel.

11. The portable computer of claim 10, wherein the protective layer is transparent and provided with a third color.

12. The portable computer of claim 9, wherein the switch is a push-button switch.

13. The portable computer of claim 9, wherein the switch comprises two pressure sensors located on both sides of the touch module respectively.

14. The portable computer of claim 13, wherein the pressure sensors are suitable for sensing pressure simultaneously or individually in order to control the touch module to perform the first touch function or the second touch function.

15. The portable computer of claim 9, wherein the first touch function and the second touch function comprise at least one of the keyboard touch function and the cursor dragging function.

16. The portable computer of claim 9, wherein the first touch pattern and the second touch pattern comprise at least one of the keyboard pattern and the cursor dragging region.

* * * * *